May 13, 1930.  J. S. SHAW ET AL  1,758,859
SPEED VARYING GEAR
Filed June 17, 1929    3 Sheets-Sheet 2

May 13, 1930. J. S. SHAW ET AL 1,758,859
SPEED VARYING GEAR
Filed June 17, 1929    3 Sheets-Sheet 3
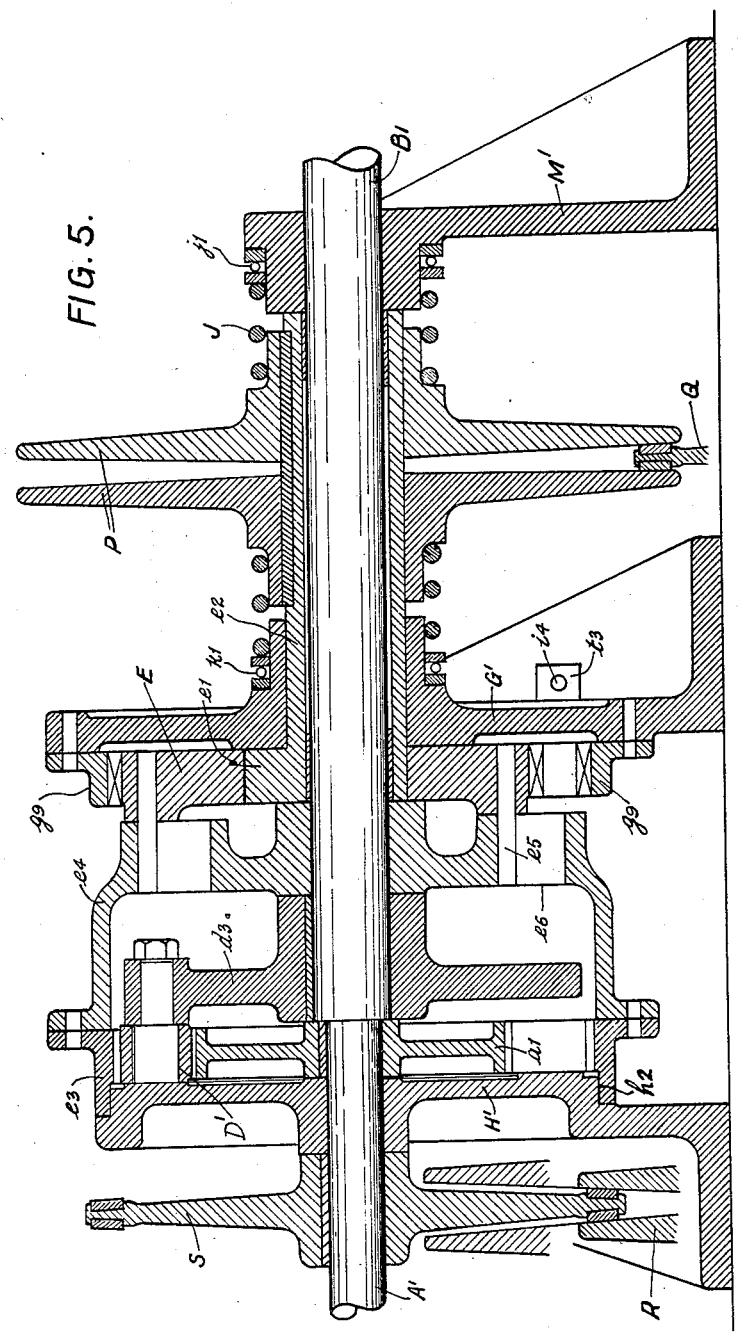
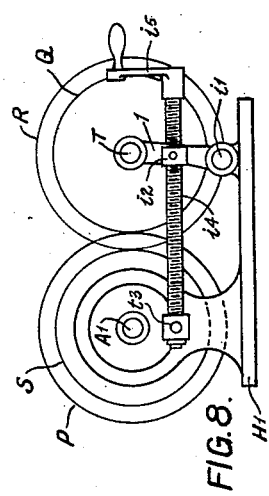
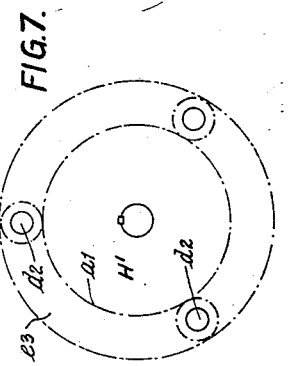
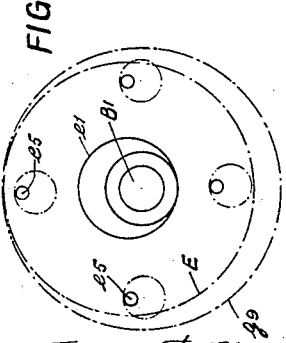

Patented May 13, 1930

1,758,859

UNITED STATES PATENT OFFICE

JOHN STANDEN SHAW, OF FAZAKERLEY, LIVERPOOL, AND WALTER HEAP, OF WEST DERBY, LIVERPOOL, ENGLAND

SPEED-VARYING GEAR

Application filed June 17, 1929, Serial No. 371,677, and in Great Britain June 20, 1928.

This invention relates to improvements in speed varying and speed reducing gear in which the variation of speed may be effected continuously, and has reference more particularly to that type of gear in which an epicyclic gear is interposed betwen the driving and driven shaft so that two members thereof are connected respectively to the said shafts, the speed of the driven shaft being determined by controling the speed of the third member of the epicyclic gear, said control being effected by means of an eccentrically mounted gyrating gear wheel after the manner described in specification to British Letters Patent No. 310.064 made by the present applicants and another, and the object of the present invention is to provide a gear of this type specially applicable for use in factories, mills, workshops and the like.

One improvement according to the present invention consists in driving the sleeve which drives the eccentric on which the gyrating wheel is mounted by means of two pairs of intermeshing spring-controlled coned members, one member of each pair being mounted on a side shaft capable of movement to and from the common axis of the driving and driven shafts, the other two coned members being respectively fixed to the driving shaft and the sleeve. A further improvement consists in mounting the gear in two end bearing brackets and an intermediate fixed bearing bracket, and the epicyclic gear and the gyrating wheel gear are located between the said intermediate bearing bracket and one of the end bearing brackets, the said intermediate bearing bracket carrying the fixed part by which the movement of the gyrating wheel is controlled. The sleeve on which the eccentric is carried extends through the intermediate bracket, and the two-part coned member which is geared to the sleeve is located between the intermediate bracket and the other end bracket, which brackets take the thrust of the springs by which the thrust parts of the said member are pressed together. The intermediate bracket in the one modification carries a fixed casing which encloses the whole of the gear, the said casing being in another modification formed by extending the peripheral portion of one of the internally toothed wheels.

The invention also includes details of construction as hereinafter described and claimed.

The invention is illustrated in the accompanying drawings, in which,—

Figs. 1 to 4 show an arrangement in which the eccentric for driving the gyrating wheel is formed on a sleeve rotatably mounted on the driving shaft, the rotation of the gyrating wheel being prevented by an Oldham coupling; and Figs. 5 to 8 show a modification in which the sleeve carrying the eccentric of the gyrating wheel is mounted on the driven shaft, the gyrating wheel being connected to the studs or slots which form the equivalent of the Oldham coupling.

Fig. 5 is a view similar to Fig. 1; and

Figs. 6, 7 and 8 are views similar to Figs. 2, 3 and 4.

Figure 1:
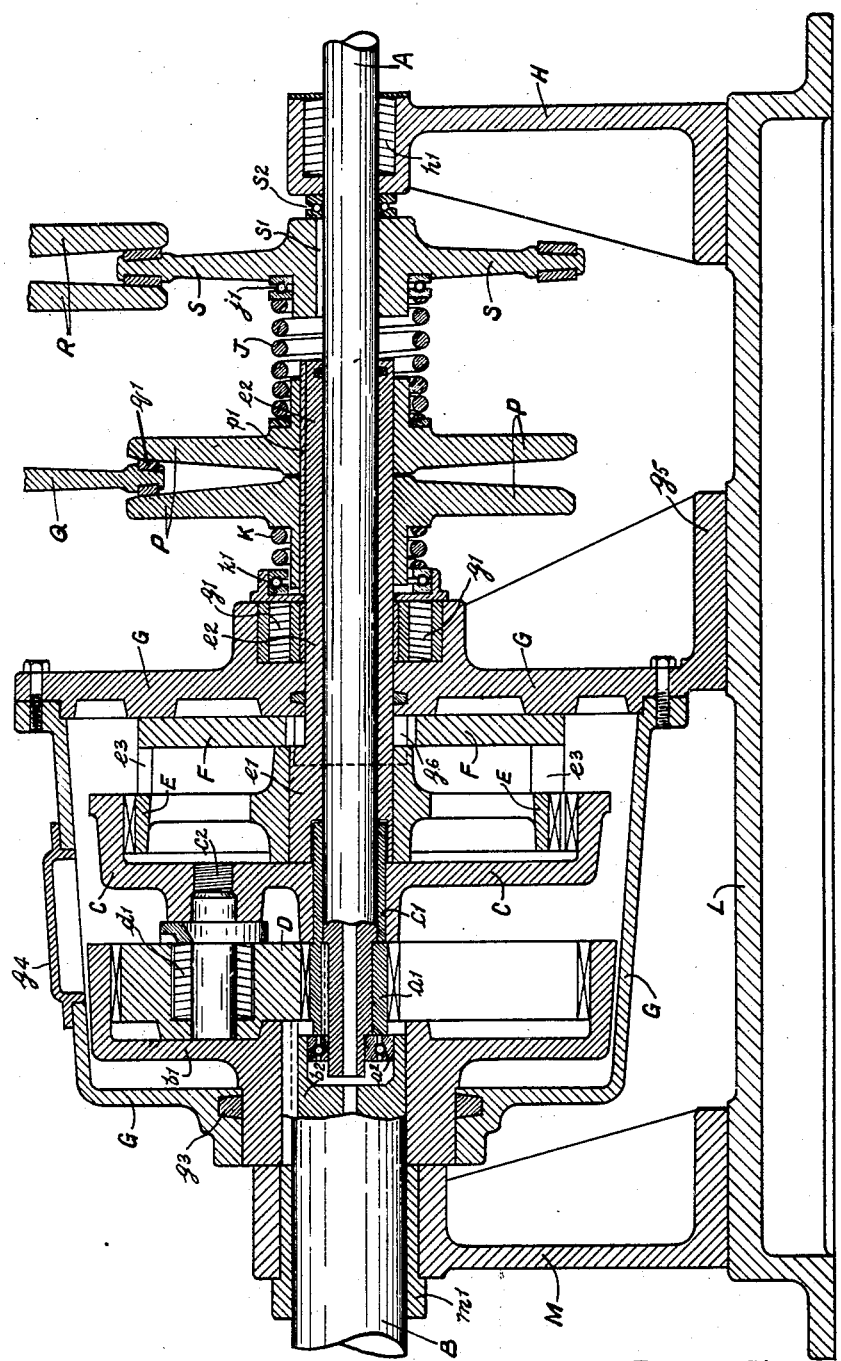
Fig. 1 is an elevation in conventional longitudinal section.

Fig. 8 showing conventional means for transmitting movement to the lay shaft relatively to the driving and driven shafts.

Referring first to Figs. 1 to 4,—

A is the driving shaft, B the driven shaft, H and M brackets in which these respective shafts are journalled, the bracket H carrying a spring roller bearing $h^1$ for the shaft A, and the bracket M carrying a bush $m^1$ for the shaft B; the two brackets are carried on a base plate L. The shaft A has keyed to it an externally toothed pinion $a^1$ and the shaft B carries an internally toothed wheel $b^1$ which will be termed the driving wheel. The pinion $a^1$ and internal wheel $b^1$ are connected together by planetary pinions D rotating on spring roller bearings $d^1$ fitted to studs $c^2$ carried by the internally toothed wheel C which will be termed the control wheel.

E is an eccentrically mounted externally toothed wheel referred to as the gyrating wheel, which wheel is journalled on an eccentric portion $e^1$ of a sleeve $e^2$ concentrically and rotatably mounted on the driving shaft A; rotation of the sleeve $e^2$ rotates the axis of the wheel E about the axis of the shaft A, and the gyrating wheel is held against rotation about its own axis by being connected to a fixed part by an Oldham coupling or equivalent device. In the drawing, an Oldham coupling F is shown having two slots at right angles, the one slot sliding on a projection $q^6$ carried from the fixed bracket G, which in turn is secured to the base plate L by the foot $g^5$, the other slot at right angles engaging with a projection $e^3$ carried from the gyrating wheel, the Oldham coupling thus acting in well known manner to permit the rotation of the centre of the wheel E as a whole without permitting the rotation of the wheel about its centre.

The sleeve $e^2$ and eccentric $e^1$ are driven from the driving shaft A by any suitable means which are adapted to vary in continuous manner, as distinguished from a step-by-step manner, the speed of the wheel E. In the drawings the arrangement now well known as the Whittle drive is shown. This drive comprises coned members P, Q, R, S, held against rotation relatively to the sleeve $e^2$, by means of the feather $p^1$.

The two coned members P are pressed together by two springs J and K which rotate with the members P, and the axial thrust of the spring K is taken by the thrust ring of the ball race $k^1$ which bears against the boss of the fixed member G; and the thrust of the spring J is taken by the race of the thrust ball bearing $j^1$ which bears against the coned member S keyed to the shaft A by the key $s^1$, the thrust of which member is in turn taken by the race of a thrust ball bearing $s^2$, the other race of which is held against axial movement by engagement with a boss on the bracket H. The two members R, which are similar to and similarly mounted to the members P, and the member Q which is similar to and similarly mounted on the member S, are carried on a side shaft parallel with the shaft A and carried in blocks, or at the ends of levers I pivoted on a shaft $i^1$ to which angular movement can be imparted, said angular movement varying the velocity ratio between A and $e^2$ in well known manner.

The shaft A is assumed to be driven at a uniform speed, and the speed transmitted to the shaft B through the pinion $a^1$ and the internal toothed wheel $b^1$ will evidently be a function of the rotation of the control wheel C carrying the planetary pinions, the rotation of C in turn being controlled through the gyrating wheel in continuous manner by the operation of the friction gearing P, Q, R, S.

Obviously the rotation of the control wheel C may be made such that the rotation of the planetary pinions bodily about their axes is such that the wheel $b^1$ and the shaft B are held stationary. This is the critical speed of C; variation of the speed C above or below the critical speed by the operation of the gearing P, Q, R, S permits the speed of the shaft B to be continuously varied within limits in one direction or the other.

In order to preserve concentricity of the shafts A and B the end of the shaft A is journalled in a ball bearing $a^2$ fitted in the recess $b^2$ in the end of the shaft B. The fixed member G forms a casing which encloses the gear, access to which is obtained by the door $g^4$; the flange of the wheel $b^1$ extends through the casing, the bearing being lubricated by a lubricant pad $g^3$ which excludes dust.

Figure 2:
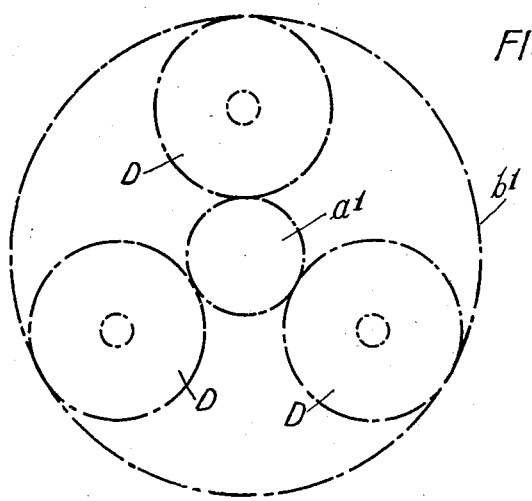
Figs. 2, 3 and 4 are diagrammatic end views.
Figure 3:
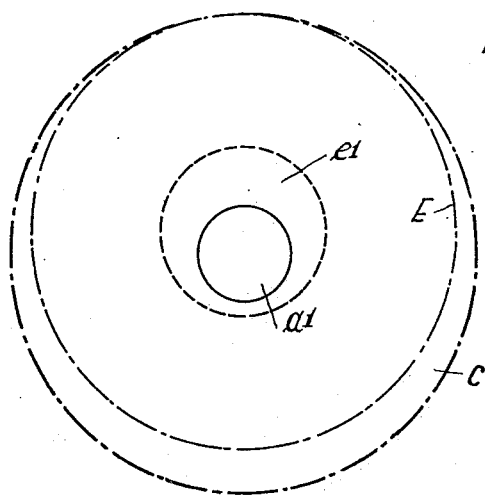
Figure 4:
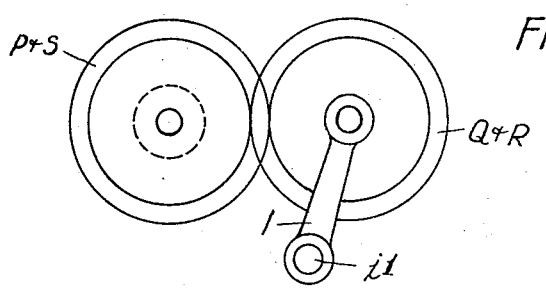

Figs. 2 and 3 show diagrammatically the arrangement of the spur wheels and the gyrating wheel, and Fig. 4 is a diagrammatic end view of the friction gearing P, Q, R, S, lever I and shaft C'.

Referring now to Figs. 5 to 8,—

A' is the driving shaft and B' the driven shaft. Motion is conveyed from the driving shaft to the driven shaft as before through an epicyclic gear, the inner member of which—the externally toothed wheel $a^1$—is driven by the driving shaft as before; the intermediate member is the planetary pinion member $d^3$ keyed to the driven shaft; the outer member of the epicyclic gear, instead of being keyed to the driven shaft as in Fig. 1 is, in the present modification, a wheel $e^3$ carried by a rotating enclosing casing $e^4$ freely mounted on the shaft B', which casing in turn is driven by the gyrating wheel E mounted on an eccentric $e^1$ formed on the sleeve $e^2$ mounted on the shaft B' and driven by Whittle friction gearing P, Q, R, S, interposed between the driving shaft A' and the sleeve $e^2$ and constructed and operated in the manner described in connection with Figs. 1 to 4.

The motion of the gyrating wheel E is transmitted to the wheel $e^3$, keyed to the casing $e^4$, by means of pins $e^5$ rigidly connected to the gyrating wheel and engaging apertures $e^6$ formed in the casing $e^4$, said aperture being sufficiently large to permit the pins $e^5$ to rotate about the centre of the eccentric, whilst the casing $e^4$ rotates about the centre of the shaft B'. The gyrating wheel E gears with a fixed wheel $g^9$ bolted to a fixed bracket G'. The shaft B' is journalled in the bearing bracket M' and the shaft A' is journalled in the bearing bracket H', the latter having a bearing portion $h^2$ which forms a bearing for the recessed portion of the wheel $e^3$. The planetary pinions D' are in this arrangement carried from studs $d^2$ carried from the disc member $d^3$ keyed to the driven shaft B' which disc drives the said shaft.

The shaft A' is usually uniformly rotated at a higher speed than that which it is desired to give the shaft B', and the wheel $a^1$ is usually rotated at a constant speed. The speed of the disc member $d^3$ which is keyed to the driven shaft B will therefore be a function of the rotation of the wheel $e^3$, and this rotation is varied by varying the speed of rotation of the eccentric $e^1$ driven by the shaft A' through the variable speed gearing P, Q, R, S.

Assuming therefore that the wheel $e^3$ is driven at a peripheral speed equal and opposite to that of the wheel $a^1$, the axes of the planetary pinions remain stationary, and the shaft B' is stopped.

In Fig. 8 the gear is mounted on a base plate H', the lay shaft T being carried on an arm I pivotally mounted at $i^1$ on the base plate. On the arm I a nut $i^2$ is pivotally mounted, through which nut the screwed spindle $i^4$ passes, one end being housed in a thrust bearing $t^3$ pivotally mounted on G', the other end being provided with operating means such as a handle $i^5$. Rotation of the handle $i^5$ in one direction or the other causes the lay shaft to approach or to recede from the shafts A' and B' causes variation of the speed of the wheel above or below the critical speed by means of the continuous varying friction gear, and permits the speed of the shaft B' to be varied, continuously, within limits, in either direction.

The use of the gyrating wheel in both modifications permits of the arrangement forming a speed-reduction, as well as the speed-varying gear, because of the speed reducing characteristics obtained by the eccentric or gyrating wheel.

The details of construction may be varied in accordance with the speed of, and the power to be transmitted between, the driving and driven shafts.

Having now fully described our invention, we declare that what we claim and desire to secure by Letters Patent is:—

1. In a speed changing and reversing gear, in combination, an epicyclic driving mechanism comprising an externally toothed wheel element, an internally toothed wheel element, and a planetary pinion element with planetary pinions gearing with the said toothed wheels, and the axes of which are mounted on a part rotatable about a common axis; a driving shaft rotatable about the common axis; and connected to one of the said elements; a driven shaft rotatable about the common axis and connected to another of said elements; and a control mechanism adapted to drive the other element, said control mechanism comprising an eccentric rotatable about the common axis, a gyrating wheel mounted on the eccentric and an internally toothed wheel with which the gyrating wheel gears; and a secondary speed varying mechanism through which the driving shaft drives the eccentric and comprising a shaft parallel to the common axis, means for varying the distance between the shaft and the common axis, and two pairs of conical friction driving members, one pair connecting the driving shaft to the lay shaft, and one pair connecting the lay shaft to the eccentric, one member of each of said pairs being a disc with a coned periphery, and the other member being a pair of connected reversely set coned discs pressed together by spring pressure so as to frictionally engage the respective single discs, substantially as described.

2. In a gear as claimed in claim 1, mounting the eccentric on a sleeve rotatably mounted on one of the shafts, providing three fixed bearings to carry the shafts, locating the epicyclic mechanism and the control mechanism between an end bearing and the centre bearing, extending the sleeve through the centre bearing, feathering on the said extension the pair of coned discs of the frictional member which drives the eccentric, and providing two helical springs, the one interposed between one of the said coned discs and the centre bearing, and the other interposed between the other coned disc and the end bearing; substantially as described.

3. In a gear as claimed in claim 1, providing three fixed bearings to carry the shafts, locating the epicyclic mechanism and the control mechanism between one of the end bearings and the centre bearings, and enclosing the said mechanisms by a cylindrical cover extending from the centre bearing to the said end bearing; substantially as described.

4. In a gear as claimed in claim 1, connecting the externally toothed wheel of the epicyclic mechanism to the driving shaft, connecting the internally toothed wheel of the epicyclic mechanism to the driven shaft, and connecting the planetary pinion element of the epicyclic mechanism to the internally toothed wheel with which the gyrating wheel gears; and providing the control gear with an element which holds the gyrating wheel against rotation about its axis; substantially as described.

5. In a gear as claimed in claim 1, connecting the externally toothed wheel of the epicyclic mechanism to the driving shaft, connecting the internally toothed wheel of the epicyclic mechanism to the driven shaft, and connecting the planetary pinion element of the epicyclic mechanism to the internally toothed wheel with which the gyrating wheel gears; three fixed bearings to rotatably support the shafts, locating the epicyclic mechanism and the control mechanism between an end bearing and the centre bearing, and providing a coupling between the centre bearing and the gyrating wheel adapted to prevent rotation of the said wheel about its own axis; substantially as described.

6. In a gear as claimed in claim 1, a pair of levers keyed to a spindle mounted in bearings, and bearings in the end of the levers to take the lay shaft; a lever keyed to the spindle, a nut pivotally attached to the said lever; a screw-threaded member engaging the said nut, and a bearing pivoted to a fixed part in which the screw-threaded member is journalled and held against longitudinal movement; substantially as described.

In witness whereof we have set our hands.

JOHN STANDEN SHAW.
WALTER HEAP.